DEFENSIVE PUBLICATION

UNITED STATES PATENT OFFICE

Published at the request of the applicant or owner in accordance with the Notice of Dec. 16, 1969, 869 O.G. 687. Tl abstracts of Defensive Publication applications are identified by distinctly numbered series and are arranged chronologicall The heading of each abstract indicates the number of pages of specification, including claims and sheets of drawings containe in the application as originally filed. The files of these applications are available to the public for inspection and reproductic may be purchased for 30 cents a sheet.

Defensive Publication applications have not been examined as to the merits of alleged invention. The Patent Office mak no assertion as to the novelty of the disclosed subject matter.

PUBLISHED DECEMBER 1, 1970

881 O.G. 21

T881,003

PROCESS FOR BONDING A NONWOVEN WEB OF CONTINUOUS FILAMENTS

Arthur John Herrman, Nashville, Tenn., assignor to E. I. du Pont de Nemours and Company, Wilmington, Del., a corporation of Delaware

Filed Apr. 24, 1970, Ser. No. 31,766
Int. Cl. B29h *9/02;* D04h *3/14, 5/06*
U.S. Cl. 156—181
No Drawing. 11 Pages Specification

A method for obtaining bonded continuous filament nonwoven fabric having an improved balance of physical properties which involves exposing an unbonded nonwoven web comprising a major proportion of high melting matrix filaments and a minor proportion of lower melting binder filaments having a nonround cross section to temperatures in the vicinity of the binder melting point, the degree of nonroundness of the binder filaments being characterized by a ratio of the filament cross-sectional perimeter to the square root of the cross-sectional area $(P/\sqrt{A})$ of at least 7. Residence time at the bonding temperature should be no greater than about five seconds and preferably less than one second.